US012766679B2

(12) United States Patent
Lalla et al.

(10) Patent No.: US 12,766,679 B2
(45) Date of Patent: Oct. 20, 2026

(54) HAND-HELD POWER TOOL

(71) Applicant: Robert Bosch GmbH, Stuttgart (DE)

(72) Inventors: Fabian Lalla, Lage (DE); Bernhard Hegemann, Filderstadt (DE); Juergen Hesse, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 18/543,167

(22) Filed: Dec. 18, 2023

(65) Prior Publication Data

US 2024/0198501 A1 Jun. 20, 2024

(30) Foreign Application Priority Data

Dec. 19, 2022 (DE) .................... 10 2022 213 871.6

(51) Int. Cl.
*B25B 23/06* (2006.01)
*B25B 21/00* (2006.01)
*B25F 5/00* (2006.01)

(52) U.S. Cl.
CPC .............. *B25B 23/06* (2013.01); *B25B 21/00* (2013.01); *B25F 5/001* (2013.01); *B25F 5/008* (2013.01)

(58) Field of Classification Search
CPC ....... B25B 21/00; B25B 21/02; B25B 21/023; B25B 21/026; B25B 23/0035; B25B 23/02; B25B 23/06; B25B 23/08; B25B 23/141; B25B 23/1415; B25B 23/147; B25B 23/1475; B25F 1/04; B25F 5/001; B25F 5/006; B25F 5/008; B25F 5/027; B25F 5/029; B25C 1/08; B23B 45/008; B23Q 3/15726; B23Q 3/15766
See application file for complete search history.

(56) References Cited

U.S. PATENT DOCUMENTS

| | | | | |
|---|---|---|---|---|
| 2010/0279839 | A1* | 11/2010 | Moser | B25B 21/00 483/30 |
| 2016/0001378 | A1 | 1/2016 | Liu | |
| 2022/0080573 | A1* | 3/2022 | Wang | B25F 5/001 |
| 2022/0118589 | A1* | 4/2022 | Takahagi | B25B 21/026 |
| 2023/0191580 | A1* | 6/2023 | Eba | B25B 21/008 173/216 |

FOREIGN PATENT DOCUMENTS

| | | | | |
|---|---|---|---|---|
| CA | 3215084 | A1 * | 10/2022 | B23B 45/02 |
| CN | 111906730 | * | 11/2020 | |
| CN | 111906730 | A | 11/2020 | |
| CN | 115229738 | * | 10/2022 | |
| DE | 10 2006 059 688 | A1 | 6/2008 | |
| DE | 10 2011 082 787 | A1 | 3/2013 | |
| DE | 10 2011 087 294 | A1 | 5/2013 | |
| DE | 10 2014 008 831 | A1 | 12/2015 | |
| DE | 10 2020 209 489 | A1 | 2/2022 | |
| WO | 95/05261 | A1 | 2/1995 | |
| WO | 2008/074536 | A1 | 6/2008 | |

* cited by examiner

*Primary Examiner* — Robert J Scruggs
(74) *Attorney, Agent, or Firm* — Maginot, Moore & Beck LLP

(57) ABSTRACT

A hand-held power tool, in particular a screwdriver, includes a housing, a drive motor, and a gear unit for driving a tool holder designed to hold an insertion tool, and having an insertion tool magazine for storing a plurality of selectable insertion tools. The gear unit is arranged at least in sections within the insertion tool magazine.

18 Claims, 8 Drawing Sheets

HAND-HELD POWER TOOL

BACKGROUND

This application claims priority under 35 U.S.C. § 119 to patent application no. 10 2022 213 871.6, filed on Dec. 19, 2022 in Germany, the disclosure of which is incorporated herein by reference in its entirety.

The present disclosure relates to a hand-held power tool.

From DE 10 2006 059 688 A1, a hand-held power tool with a drive unit for rotating the drive of a tool holder is known.

SUMMARY

The present disclosure proceeds from a hand-held power tool, in particular a screwdriver, having a housing, a drive motor, and a gear unit for driving a tool holder designed to hold an insertion tool, and having an insertion tool magazine for storing a plurality of selectable insertion tools. It is proposed that the gear unit be arranged at least in sections within the insertion tool magazine.

The disclosure provides a compact hand-held power tool by having the gear unit arranged at least in sections within the insertion tool magazine.

The hand-held power tool can be designed as an electrically operated hand-held power tool. The electrically operated hand-held power tool can be designed as a mains-operated or a cordless hand-held power tool. For example, the hand-held power tool can be designed as a screwdriver or a drill driver.

The housing of the hand-held power tool is designed to at least partially hold the tool holder, the drive motor, the gear unit and the insertion tool magazine. The housing can be designed as a shell housing with two half shells. The housing can comprise at least one motor holder designed to at least partially hold the drive motor and arrange the drive motor substantially within the housing.

The drive motor can be designed as an electric motor. The drive motor can have a motor housing, wherein the motor holder of the housing can at least partially hold the motor housing. The drive motor is designed such that it can be actuated via a manual switch. When the manual switch is actuated by a user, the drive motor is switched on and the hand-held power tool is put into operation. If the manual switch is not further actuated by the user, the drive motor is switched off. The drive motor can preferably be electronically controlled and/or regulated in such a way that a reversing mode and a specification for a desired rotational speed can be implemented. In reversing mode, the drive motor can be switched between a clockwise direction of rotation and a counterclockwise direction of rotation. To switch the drive motor in reversing mode, the hand-held power tool can comprise a rotation direction switching element, in particular a rotation direction changeover switch.

The drive motor can at least drive the gear unit by means of a motor shaft. The motor shaft can at least comprise one motor pinion, which can be operatively connected to the gear unit. The motor pinion can be arranged substantially within the insertion tool magazine. The drive motor can also drive the tool holder by means of the motor shaft via the gear unit. The hand-held power tool can have a tool axis. A rotation axis of the motor shaft can form the tool axis. The hand-held power tool can have a further tool axis, wherein an axis of rotation of the tool holder forms the further tool axis. In particular, "axial" should be understood as essentially parallel to the tool axis and/or the further tool axis.

Whereas "radial" should be understood as essentially perpendicular to the tool axis and/or the further tool axis.

The gear unit is arranged at least in sections within the insertion tool magazine. The gear unit comprises a gear output shaft that drives the tool holder via an intermediate gear. The gear output shaft can project at least in sections from the insertion tool magazine. The motor shaft and the gear output shaft can be arranged coaxially to each other. The gear unit can comprise a gear housing.

In one embodiment, the gear unit is designed as a planetary gear having at least one planetary gear stage, wherein the at least one planetary gear stage is arranged substantially concentrically to the insertion tool magazine. Here, for example, the gear unit has three planetary gear stages. The three planetary gear stages can be substantially concentric to the insertion tool magazine. The gear output shaft can at least in sections be concentric to the insertion tool magazine. The gear housing is arranged radially to the tool axis between the gear unit, in particular the planetary gear, and the insertion tool magazine. The gear unit, in particular the planetary gear, is arranged in the axial direction to the tool axis between the drive motor and the intermediate gear. The gear unit, in particular the planetary gear, can be substantially entirely arranged within the insertion tool magazine.

The tool holder can be driven by the gear unit via the intermediate gear. The tool holder can be designed as an internal tool holder, for example a bit holder. It is also conceivable that the tool holder be designed as a drill chuck. The tool holder can hold insertion tools, such as screwdriver bits, so that a user can make screw connections between a fastener and a fastener holder.

The insertion tool magazine is designed to store the plurality of selectable insertion tools. The insertion tool magazine can store screw bits up to an axial length of 50 mm. The insertion tool magazine can be designed as a drum magazine having a plurality of insertion tool chambers. The insertion tool magazine is designed rotatably opposite the housing. The insertion tool magazine is arranged at least partially within the housing. The housing can at least partially enclose the insertion tool magazine. The insertion tool chambers are designed such that each of the insertion tools can be held into one of the insertion tool chambers. Each of the insertion tool chambers at least partially encloses the respective insertion tool at least in the circumferential direction of the respective insertion tool. The insertion tool magazine is circumferentially arranged around the gear housing.

The hand-held power tool can have a control unit at least for controlling the drive motor. The control unit can be arranged in the housing. The hand-held power tool further comprises a power supply, wherein the power supply is provided for cordless operation by means of rechargeable batteries, in particular hand-held power tool rechargeable battery packs, and/or for mains operation. In a preferred embodiment, the power supply is designed for cordless operation. In the context of the present disclosure, a "hand-held power tool rechargeable battery pack" is intended to be understood as a combination of at least one rechargeable battery cell and a rechargeable battery pack housing. The hand-held power tool rechargeable battery pack is advantageously designed for supplying power to commonly available cordless hand-held power tools. The at least one rechargeable battery cell can, for instance, be designed as a Li-ion rechargeable battery cell having a nominal voltage of 3.6 V. The hand-held power tool rechargeable battery pack can comprise up to ten rechargeable battery cells, for example, wherein a different number of rechargeable battery cells also is conceivable. Both an embodiment as a cordless hand-held power tool and operation as a mains-operated hand-held power tool are sufficiently well-known to those skilled in the art, so the specifics of the power supply will not be discussed here.

In the context of the present disclosure, “at least in sections within” is to be understood such that at least a section of a component or element is arranged within another component or element, such that at least the section of the component is covered by the other component.

In one embodiment of the hand-held power tool, the gear unit, in particular the gear housing, comprises an outer holder for the insertion tool magazine, wherein the outer holder is designed, such that the insertion tool magazine is rotatably arranged on the gear unit, in particular the gear housing. The gear unit, in particular the gear housing, forms the outer holder for the insertion tool magazine. The outer holder for the insertion tool magazine can be connected to the gear unit, in particular the gear housing, in a form-fit, force-fit and/or material-fit manner. It is also conceivable that the outer holder for the insertion tool magazine and the gear unit, in particular the gear housing, be formed in one piece. The outer holder for the insertion tool magazine rotatably stores the insertion tool magazine at least partially within the housing, such that the user can twist the insertion tool magazine as required. The insertion tool magazine is rotatable relative to the gear unit, in particular the gear housing. The insertion tool magazine comprises an inner holder for the gear unit, in particular the gear housing. The outer holder for the insertion tool magazine accommodates the inner holder of the insertion tool magazine for the gear unit, in particular the gear housing. As a result, the insertion tool magazine can be circumferentially arranged around the gear unit. For example, the insertion tool magazine can be designed as a cylindrical body, such that an inner lateral surface of the insertion tool magazine forms the inner holder for the gear unit. Furthermore, the gear housing can be designed as a hollow body, wherein the at least one planetary gear stage is substantially arranged within the hollow body. For example, the gear housing can be pot-like or cup-like.

In one embodiment of the hand-held power tool, the gear unit, in particular the gear housing, comprises at least one air inlet opening formed on an end facing away from the drive motor and designed to direct air in the direction of the drive motor. By means of example, four air inlet openings are provided, which are arranged circumferentially around the tool axis. The gear housing comprises a gear neck, wherein the air inlet openings are formed in sections circumferentially around the gear neck. The air inlet openings can be, by means of example, circular, elliptical, or arc-shaped. For example, the air inlet openings can be formed at least in sections concentrically to the gear output shaft on the gear housing. The air inlet openings allow air to be introduced into the gear housing via the air inlet openings. The air can then flow in the direction of the drive motor to cool it. The air inlet openings can be arranged axially to the tool axis between the intermediate gear and at least one of the planetary gear stages.

In one embodiment of the hand-held power tool, the gear unit comprises a gear end plate, wherein the gear end plate can be locked by means of at least one locking element via a gear housing holder. The gear housing can comprise the gear housing holder, wherein the gear housing can form the gear housing holder. The gear housing and the gear housing holder can be connected to each other in a form-fit, force-fit, and/or material-fit manner, wherein this can also be formed in one piece. The gear housing holder can be arranged on an inner circumference of the gear housing. It is conceivable that, for example, two, three or four gear housing holders be provided. The gear housing holder is arranged axially to the tool axis between the at least one planetary gear stage and the drive motor. For example, the gear end plate can be designed like a disk. The gear end plate can form the locking element, so that it is formed in one piece. By means of example, four locking elements can be formed. Furthermore, the locking element can be designed in the manner of a bar, a protrusion, a hook or an edge circumferentially around the gear end plate. The gear end plate and the locking element are designed such that the gear end plate can be locked to the gear housing holder by means of the locking element. For this purpose, the locking element can form a screw, a latch, a snap or a bayonet connection with the gear housing holder, for example.

In one embodiment of the hand-held power tool, the gear end plate can be connected to the drive motor, in particular the motor housing, and the gear end plate has a motor shaft opening, wherein the motor shaft opening is designed, such that the motor shaft of the drive motor can be passed through the motor shaft opening. For example, the gear end plate can be bolted, latched, clamped, or connected to the drive motor, in particular the motor housing, using a type of bayonet connection. An inner diameter of the motor shaft opening is designed such that the motor pinion on the motor shaft can be passed through the motor shaft opening. For example, the motor shaft opening can be round, elliptical, slot-like or polygonal. It is conceivable that the gear end plate and the drive motor, in particular the motor housing, be spaced apart from one another or directly abut one another. It is possible for the drive motor to abut an at least partially circumferential shoulder on the inner circumference of the gear housing.

In one embodiment of the hand-held power tool, the gear end plate comprises at least one guide opening formed in the circumferential direction, which is designed to direct air in the direction of the drive motor. By means of example, four air guide openings are provided, wherein more or less than four air guide openings are possible. For example, the air guide opening can be circular, elliptical, arc-shaped, slot-like or polygonal. The air guide opening of the gear end plate can be formed substantially concentrically to the motor shaft openings. The air guide opening can be arranged radially to the tool axis between the motor shaft opening and the locking element.

In one embodiment of the hand-held power tool, the gear unit comprises at least one ring gear having at least one anti-rotation element and the gear housing comprises at least one anti-rotation holder designed on an end facing away from the drive motor, wherein the anti-rotation element is designed to engage in the anti-rotation holder and secure the ring gear against rotation. The ring gear can be arranged axially to the tool axis between the gear neck or the air inlet opening and the gear end plate or the drive motor. The ring gear can be coaxially arranged to the gear neck substantially within the gear housing. The ring gear can form the anti-rotation element such that it is formed in one piece. The anti-rotation element can be designed circumferentially on the ring gear. For example, the anti-rotation element can be designed as an at least partially circumferential bar. For example, three anti-rotation elements are formed on the ring gear. The anti-rotation holder is designed to be complementary to the anti-rotation element. Here, the anti-rotation element is designed as an arc section. The anti-rotation holder is formed at the end of the gear housing facing away from the drive motor. The anti-rotation device is designed such that the anti-rotation element can engage in the anti-rotation device at least in a form-fit manner and thereby secure the ring gear against rotation. The gear housing can form the anti-rotation holder. For example, three anti-rotation holders are formed.

In one embodiment of the hand-held power tool, the gear unit comprises a locking ring and a gear output shaft holder, wherein the locking ring is designed to rotatably hold the gear output shaft holder. The locking ring is arranged on the end of the gear housing facing away from the drive motor, wherein the locking ring is arranged substantially within the gear housing. The locking ring can be arranged axially to the tool axis between the gear neck and the drive motor. For example, the locking ring can be designed in the manner of a ring comprising a circular inner holder. The locking ring rotatably mounts the gear output shaft holder substantially within the circular inner holder. The gear output shaft holder can be at least one element of a last planetary gear stage of the planetary gear, wherein the gear output shaft holder can be a last planetary carrier, for example. In this case, the last planetary carrier is understood to be the planetary carrier that is operatively connected to the intermediate gear and/or the tool holder. For example, the gear output shaft holder can abut the locking ring. The gear output shaft holder is designed to connect the last planetary gear stage to the gear output shaft. The gear output shaft holder has at least one opening for holding a protrusion of the gear output shaft. For example, the opening of the gear output shaft holder can be round, elliptical, oval, dumbbell-like, slot-like, or polygonal. Furthermore, the gear output shaft holder has a connection holder formed on a side facing away from the drive motor. The connection holder of the gear output shaft holder can be designed in the form of three bars, for example. The connection holder is designed to further connect to the gear output shaft. The gear output shaft has at least partially circumferential shoulder-like protrusions that are at least can be connected to the connection holder in a form-fit manner. An outer circumference of the connection holder can be rotatable on the inner holder of the locking ring. The connection holder can comprise at least one opening in the circumferential direction, such that air can pass through the air inlet opening in the direction of the drive motor. The gear output shaft is connected to the intermediate gear to drive the intermediate gear.

In one embodiment of the hand-held power tool, the locking ring comprises at least one locking bar on its outer circumference and the gear housing comprises at least one locking holder, wherein the locking bar is designed to engage in the locking holder. The locking bar and the locking holder are designed to be complementary to each other. For example, the locking bar can be formed in an arc-shaped manner. The locking bar can engage in the locking holder at least in a form-fit manner. For example, three locking bars and three locking holders are provided. The anti-rotation holder and the locking holder are alternately arranged in the circumferential direction in the gear housing, for example. The anti-rotation holder and the locking holder are separated from each other by housing bars. The anti-rotation element of the ring gear can engage in the locking ring axially to the tool axis. The anti-rotation element and the locking bar can be coaxial to the tool axis.

In one embodiment of the hand-held power tool, the drive motor is arranged at least in sections within the insertion tool magazine. The drive motor at least partially projects into the inner housing of the insertion tool magazine. The insertion tool magazine can at least in sections overlap the drive motor. Furthermore, the insertion tool magazine and the motor housing can at least partially overlap.

In one embodiment of the hand-held power tool, the gear unit, in particular the gear housing, comprises an inner holder, which at least in sections accommodates the drive motor, in particular the motor housing. The inner holder of the gear unit, in particular the gear housing, at least in sections encloses the drive motor, in particular the motor housing. The gear housing and the motor housing can overlap at least in sections. The gear housing comprises at least a partially circumferential bar or collar, which can abut the motor housing. The inner holder can be formed on the at least partially circumferential bar or collar. The inner holder of the gear housing can be formed at a free end in the direction of the drive motor.

In one embodiment, the drive motor is arranged at least in sections substantially concentrically to the insertion tool magazine. A section of the drive motor, in particular the motor housing, is arranged substantially concentrically to the insertion tool magazine. The inner holder of the gear housing can be arranged radially to the tool axis between the motor housing and the insertion tool magazine.

In one embodiment of the hand-held power tool, the gear unit, in particular the gear housing, has at least one securing element on the gear neck and the housing comprises at least one securing holder, wherein the securing holder is designed such that the securing holder accommodates the securing element and secures the gear unit, in particular the gear housing, against rotations of the gear unit, in particular the gear housing. The gear neck is formed on an end of the gear housing opposite to the drive motor. The gear neck is arranged substantially axially to the tool axis between the at least one planetary gear stage and the intermediate gear. The gear neck can comprise at least one gear output shaft bearing, wherein two gear output shaft bearings are provided herein as an example. The gear neck can rotatably support the gear output shaft via the gear output shaft bearing. The securing element is designed substantially parallel to the tool axis, wherein it is also conceivable that the securing element be designed transverse to the tool axis. For example, the securing element is designed in the manner of a bar, collar or protrusion circumferentially to the gear neck. The securing element can be connected to the gear neck in a form-fit, force-fit, and/or material-fit manner. It is possible that the securing element is formed with the gear neck in one piece. By means of example, two securing elements are provided here. The securing holder accommodates the securing element at least in a form-fit manner, wherein the securing element engages in the securing holder. By means of example, the securing holder is designed in the manner of a shaft, shell or pot. By means of example, two securing holders are provided here. The housing can form the securing holder. When the securing element and the securing holder are connected, the gear housing can be secured at least against rotations of the gear housing within the housing. The securing holder can also secure and/or fix the gear housing axially to the tool axis in the direction of the tool holder via the securing element. In addition, the securing element and the securing holder prevent the gear housing from being tilted in the direction of the tool holder. In so doing, the securing element and the securing holder block the gear housing in the radial direction to the tool axis.

In one embodiment of the hand-held power tool, the gear unit, in particular the gear housing, comprises at least one contact element and the housing comprises at least one contact holder, wherein the contact element is designed to abut against the contact holder and to introduce at least radial forces that occur into the housing. The contact element can be arranged opposite the gear neck on the gear housing. The contact element can be arranged at the free end on the drive motor. Furthermore, the contact element can be coaxial and substantially concentric to the inner holder of the gear unit, in particular the gear housing. The contact element is formed in the circumferential direction of the tool axis around the gear housing. By means of example, the contact element is designed as a contact bar. The contact element can be arranged on the gear housing transversely to the tool axis. The contact element can abut the contact holder when installed in the housing. The contact element is designed to abut the contact holder while supporting the gear housing against the housing. In addition, the contact element serves as an anti-rotation lock of the gear housing. The contact holder is designed as a bar transverse to the tool axis, for example. It is conceivable that the contact holder be designed parallel to the tool axis. The contact holder can be formed from the housing so that they are in one piece. When the contact element abuts the contact holder, radial forces that occur can be dissipated in the housing.

In one embodiment of the hand-held power tool, the gear unit, in particular the gear housing, has at least one fixing element and the housing at least one fixing holder, wherein the fixing holder accommodates the fixing element at least for axial securing of the gear unit, in particular of the gear housing. The fixing element is connected to the gear housing in a form-fit, force-fit, and/or material-fit manner, wherein they can be in one piece. By means of example, the fixing element is designed in the manner of a square disc, wherein two fixing elements are provided. The fixing element is designed in the circumferential direction of the tool axis on the outer circumference of the gear housing. Furthermore, the fixing element is formed on an end facing away from the gear neck and correspondingly facing the drive motor. The fixing element can be coaxial and substantially concentric to the inner holder of the gear unit, particularly the gear housing. The fixing element engages in the fixing holder at least in a form-fit manner. This axially secures the gear housing as the fixing holder at least partially encloses the fixing element and prevents it from slipping in the direction of the intermediate gear within the housing. The fixing holder is exemplary designed in the manner of a pocket. The fixing holder is formed here by the housing, wherein it is also conceivable that they be two pieces.

In one embodiment of the hand-held power tool, the gear unit, in particular the gear housing, comprises at least one venting element arranged at least partially axially to the gear unit, in particular the gear housing, and/or the drive motor and designed to vent at least the gear unit, in particular the gear housing. The vent element is exemplary formed as an axial groove that forms a polygonal opening in the gear neck. However, other shapes of the vent element are conceivable. The vent element is formed within the inner circumference of the gear housing. The vent element is formed axially to the tool axis, wherein it is formed substantially parallel to the tool axis. The venting element is designed to vent the gear housing during assembly and provide air to the gear unit and/or drive motor for cooling during operation. The vent element has two openings, by means of example, wherein a first opening is formed on the gear neck and a second opening is formed on the drive motor.

BRIEF DESCRIPTION OF THE DRAWINGS

The disclosure is explained in more detail in the following with reference to a preferred embodiment. In the following, the drawings show.

DETAILED DESCRIPTION

Figure 1:
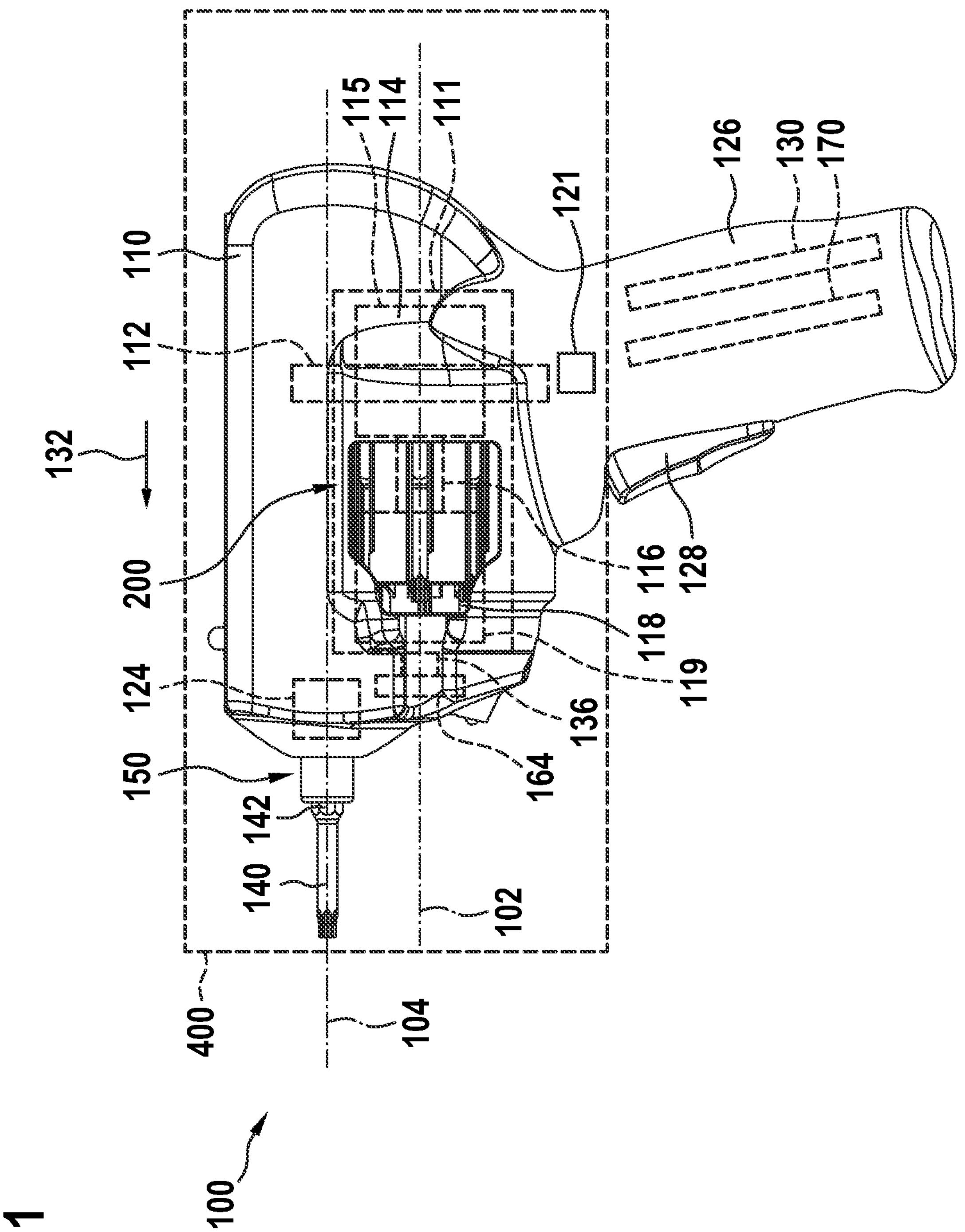
FIG. 1 a side view of a hand-held power tool according to the present disclosure.

FIG. 1 shows a hand-held power tool 100 according to the disclosure, wherein it is designed here for example as a cordless screwdriver. The hand-held power tool 100 comprises an output shaft 124 and a tool holder 150. The hand-held power tool 100 comprises a housing 110 with a handle 126. To provide a mains-independent power supply, the hand-held power tool 100 can be mechanically and electrically connected to a power supply for cordless operation, so that the hand-held power tool 100 is designed as a cordless hand-held power tool 100. In this case, a fixed battery 130 serves as a power supply. However, the present disclosure is not limited to cordless hand-held power tools, but can also be applied to mains-dependent, i.e., mains-powered, hand-held power tools.

The housing 110 comprises a drive unit 111, wherein the drive unit 111 is arranged at least partially in the housing 110. The drive unit 111 comprises an electric drive motor 114, which is supplied with current by the battery 130, and a gear unit 118. The drive motor 114 comprises a motor housing 115. The gear unit 118 is designed as a planetary gear 166, see also FIGS. 2 and 4. The drive motor 114 is designed such that it can be actuated, for example via a manual switch 128, so that the drive motor 114 can be switched on and off. The drive motor 114 can advantageously be electronically controlled and/or regulated, so that a reversing mode and a desired rotational speed can be implemented. For the reversing mode, the hand-held power tool 100 comprises a rotation direction switching element 121 designed as a rotation direction changeover switch. The rotation direction switching element 121 is designed to switch the drive motor 114 between a clockwise direction of rotation and a counterclockwise direction of rotation. The design and mode of operation of a suitable drive motor are well known to those skilled in the art, which is why they will not be discussed in detail here.

The gear unit 118 is connected to the drive motor 114 via a motor shaft 116. The gear unit 118 is provided to convert a rotation of the motor shaft 116 into rotation between the gear unit 118 and the tool holder 150, wherein the gear unit 118 and the tool holder 150 are connected to each other via an intermediate gear 164, see also FIGS. 2 and 3. The gear unit 118 comprises a gear housing 119, which is at least partially arranged in the housing 110. The hand-held power tool 100 comprises a tool axis 102, wherein an axis of rotation of the drive shaft 116 forms the tool axis 102. In addition, the hand-held power tool comprises a further tool axis 104 formed by an axis of rotation of the tool axis 150. "Axial" should be understood as essentially parallel to the tool axis 102 and/or the further tool axis 104. "Radial" should be understood as essentially perpendicular to the tool axis 102 and/or the further tool axis 104.

Furthermore, the gear unit 118 comprises a gear output shaft 136. The gear output shaft 136 drives the tool holder 150 via the intermediate gear 164. The gear output shaft 136 projects at least in sections out of an insertion tool magazine 200, see also FIGS. 2 and 3. Furthermore, the motor shaft 116 and the gear output shaft 136 are coaxially arranged with respect to each other, see also FIG. 2.

Figure 2:
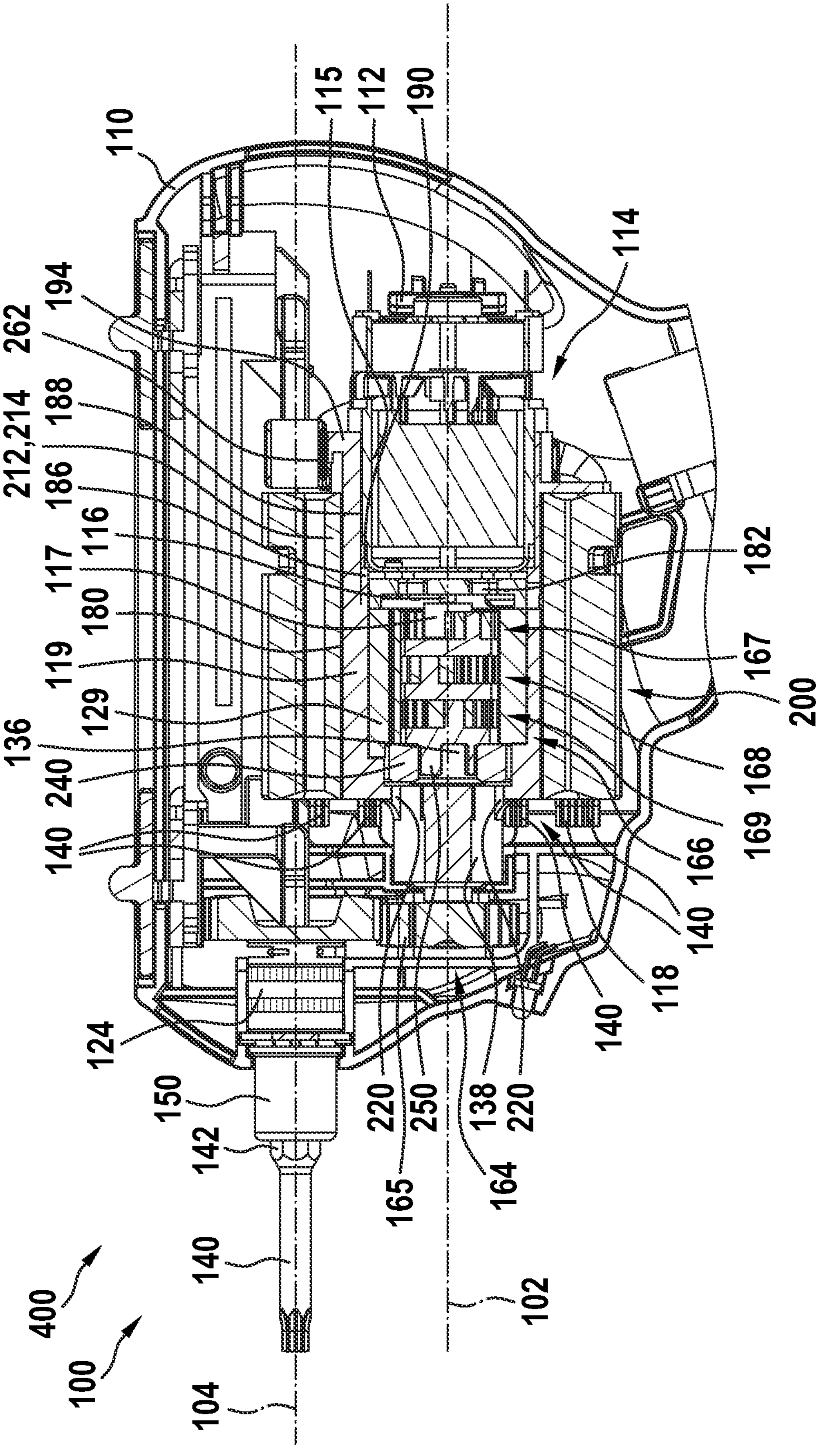
FIG. 2 a section of a longitudinal cross-section of the hand-held power tool.

The tool holder 150 is preferably integrally formed with and/or designed on the output shaft 124, see also FIG. 2. The tool holder 150 is preferably arranged in an axial direction 132 facing away from the drive unit 111. The tool holder 150 is designed here as a hexagon socket, in the form of a bit holder, which is provided to hold an insertion tool 140. The insertion tool is designed in the form of a screwdriver bit having a polygonal outer coupling 142.

The hand-held power tool 100 comprises a control unit 170 at least for controlling the drive unit 111, in particular the drive motor 114. The housing 110 at least partially accommodates the control unit 170. The control unit 170 comprises a microprocessor not shown in detail.

Figure 3:
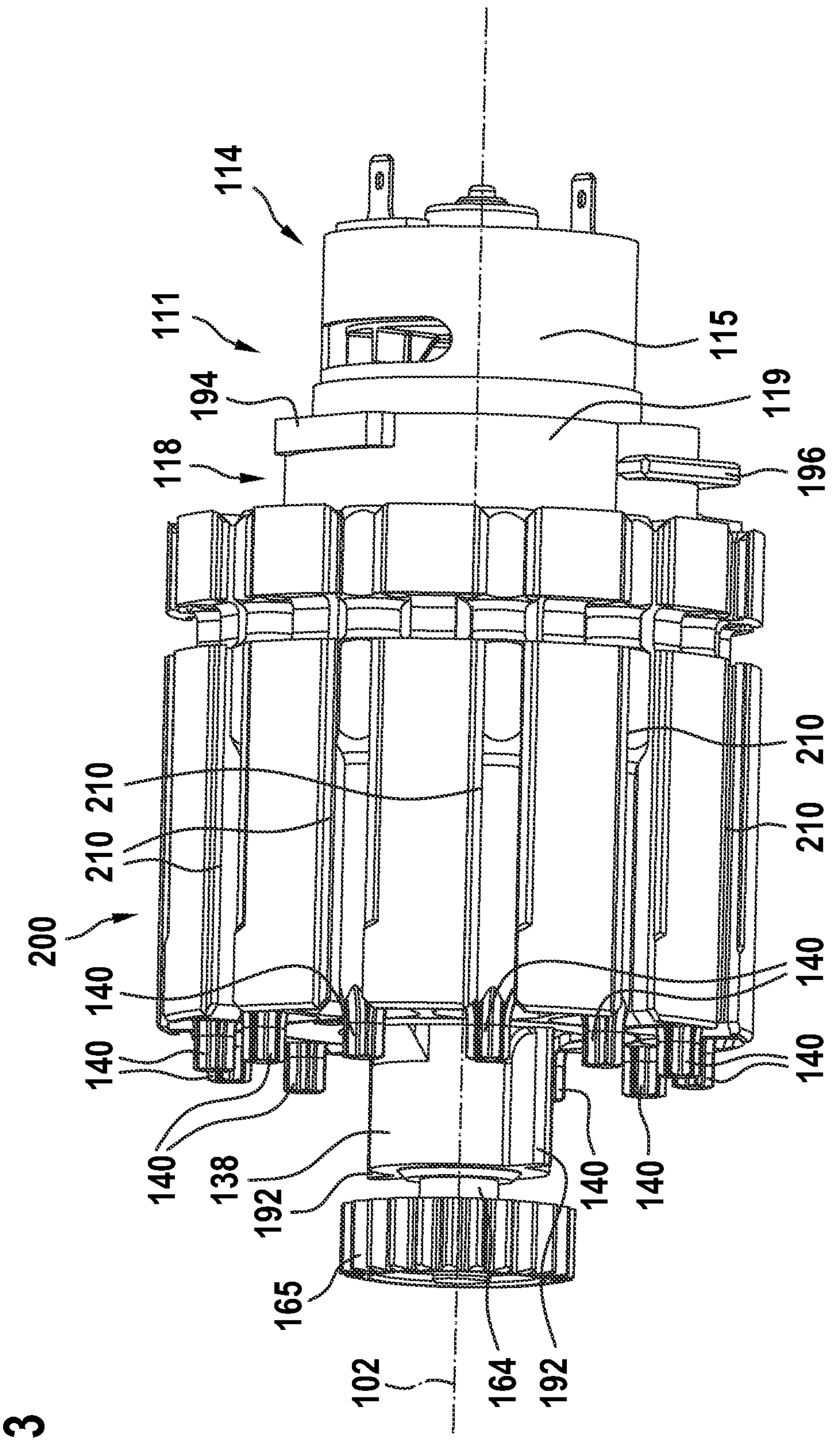
FIG. 3 a side view of an insertion tool magazine having a drive unit.

The hand-held power tool 100 comprises the insertion tool magazine 200 for storing a plurality of selectable insertion tools 140, see also FIGS. 2-4. The gear unit 118 is arranged at least in sections within the insertion tool magazine 200, see also FIGS. 2 to 4. The housing 110 at least partially accommodates the tool holder 150, the drive motor 114, the gear unit 118, and the insertion tool magazine 200. Here, the housing 110 is exemplary shaped as a shell housing with two half shells, see also FIGS. 2 and 3. The housing 110 comprises at least one motor holder 112 formed on each of the two half shells. The motor holder 112 is designed to at least partially hold the motor housing 115 and to substantially arrange it within the housing 110.

FIG. 2 shows a section 400 of a longitudinal section of the hand-held power tool 100. Electrical leads are not shown in more detail here. The motor shaft 116 comprises a motor pinion 117 that engages in the planetary gear 166. The motor pinion 117 is substantially arranged within the insertion tool magazine 200. The planetary gear 166 comprises at least one planetary gear stage 167, 168, 169 and a ring gear 129, wherein the at least one planetary gear stage 167, 168, 169 is arranged substantially concentrically to the insertion tool magazine 200. By means of example, three planetary gear stages 167, 168, 169 are provided; a first planetary gear stage 167, a second planetary gear stage 168, and a third and last planetary gear stage 169. The third planetary gear stage 169 drives the gear output shaft 136. The gear housing 119 is arranged in a radial direction to the tool axis 102 between the planetary gear 166 and the insertion tool magazine 200. Furthermore, the planetary gear 166 is arranged in an axial direction to the tool axis 102 between the drive motor 114 and the intermediate gear 164, in which the planetary gear train 166 is arranged substantially entirely within the insertion tool magazine 200.

The insertion tool magazine 200 is formed to store the plurality of selectable insertion tools 140, wherein the insertion tool magazine 200 is formed as a drum magazine. The insertion tool magazine 200 includes a plurality of insertion tool chambers 210, see also FIGS. 3 and 4. The insertion tool magazine 200 is rotatably formed opposite the housing 110, wherein it is arranged at least partially within the housing 110. Each of the insertion tool chambers 210 at least partially accommodates the respective insertion tool 140. The gear unit 118, in particular the gear housing 119, comprises an outer holder 180 for the insertion tool magazine 200, wherein the gear housing 119 here forms the outer holder 180 for the insertion tool magazine 200, such that the gear housing 119 and the outer holder for the insertion tool magazine 200 are formed in one piece, see also FIG. 4. The outer holder 180 is designed such that the insertion tool magazine 200 is rotatably arranged on the gear housing 119. The outer holder 180 for the insertion tool magazine 200 is designed such that the insertion tool magazine 200 is rotatably supported at least partially within the housing 110.

The insertion tool magazine 200 comprises an inner holder 212 for the gear unit 118, in particular the gear housing 119. The outer holder 180 for the insertion tool magazine 200 accommodates the inner holder 212 of the insertion tool magazine 200 for the gear unit 118, in particular the gear housing 119. The insertion tool magazine 200 is thereby arranged circumferentially around the gear unit 118. By means of example, the insertion tool magazine 200 is formed as a hollow cylindrical body, such that an inner lateral surface 214 of the insertion tool magazine 200 forms the inner holder 212 for the gear unit 118, see also FIGS. 3 and 4. The gear housing 119 is formed as a pot-shaped hollow body, wherein the planetary gear stages 167, 168, 169 are arranged substantially within the hollow body, see also FIGS. 3 and 4.

The gear unit 118, in particular the gear housing 119, comprises at least one air inlet opening 220 formed on an end facing away from the drive motor 114, wherein four arc-shaped air inlet openings 220 are provided herein, see also FIG. 4. The air inlet openings 220 are circumferentially arranged around the tool axis 102. Furthermore, the gear housing 119 comprises a gear neck 138, see also FIGS. 3 and 4. The gear neck 138 is formed on an end of the gear housing 119 opposite the drive motor 114, wherein the gear neck 138 is arranged substantially axially to the tool axis 102 between the third planetary gear stage 169 and the intermediate gear 164. The gear neck 138 comprises two gear output shaft bearings, not shown in detail, that rotatably support the gear output shaft 136. The air inlet openings 220 are formed in sections circumferentially around the gear neck 138. In addition, the air inlet openings 220 are formed concentrically at least in sections to the gear output shaft 138 on the gear housing 119 and arranged axially to the tool axis 102 between the intermediate gear 164 and the third planetary gear stage 169. The gear unit 118 has a gear end plate 182. The ring gear 129 is arranged axially to the tool axis 102 between the gear neck 138 and the gear end plate 182. The ring gear 129 is arranged coaxially to the gear collar 138 substantially within the gear housing 119.

Figure 4A:
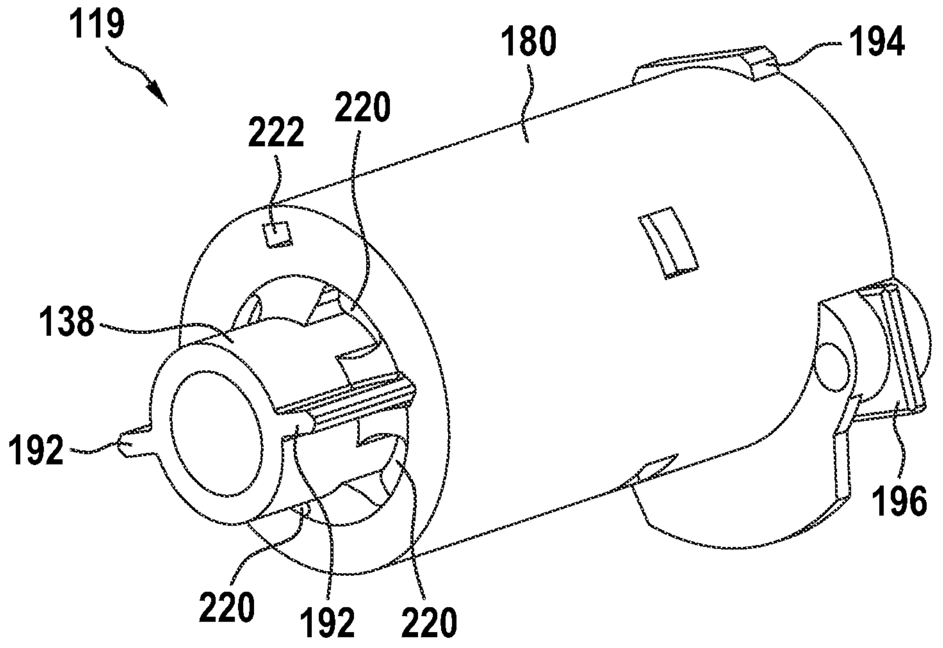
FIG. 4*a* a front perspective view of a gear housing.
Figure 4B:
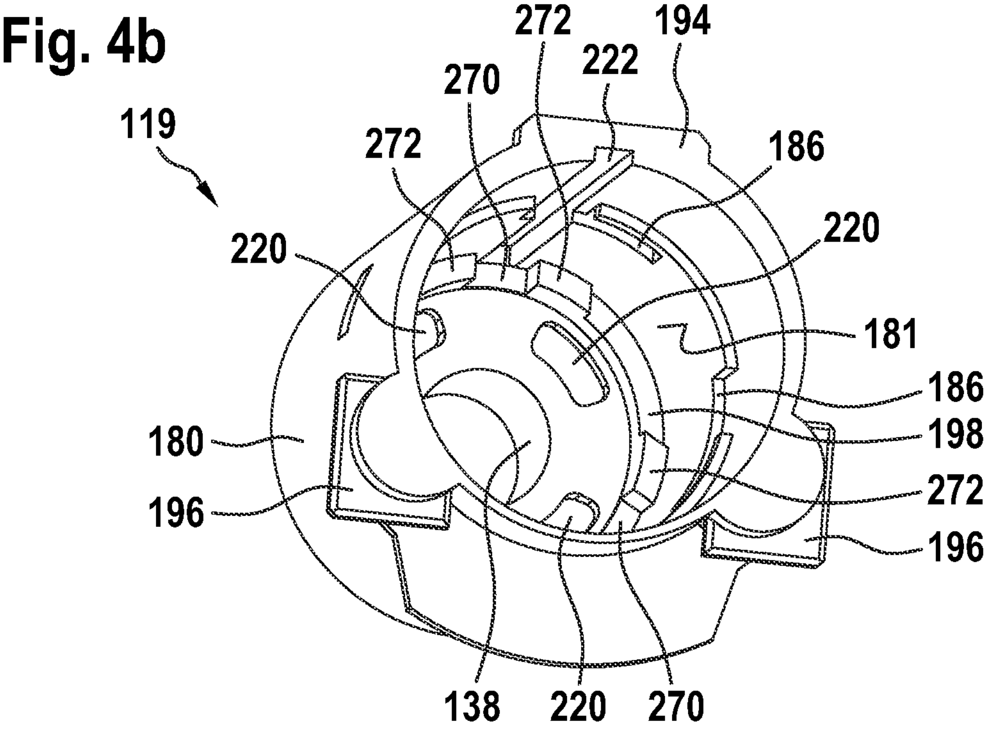
FIG. 4*b* a rear perspective view of the gear housing.

The gear end plate 182 can be locked by means of at least one locking element 184 via a gear housing holder 186, see also FIGS. 4*b* and *g*. The gear end plate 182 can be connected to the drive motor 114, in particular the motor housing 115. In this case, the gear end plate 182 is bolted, for example, to the drive motor 114, in particular the motor housing 115.

Figure 4C:
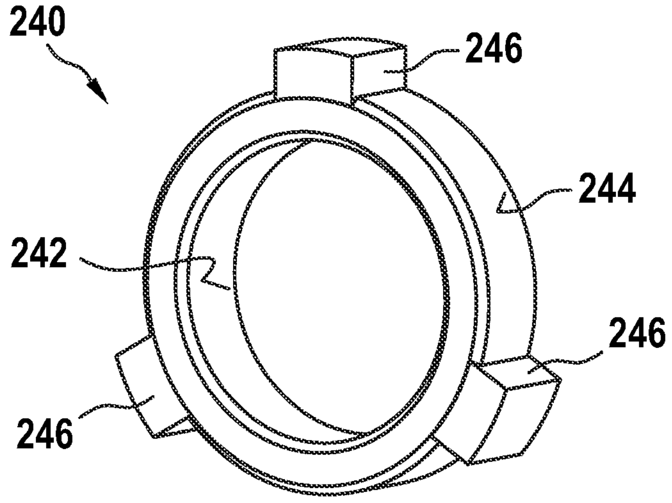
FIG. 4*c* a perspective view of a locking ring of a gear unit.

The gear unit 118 comprises a locking ring 240 and a gear output shaft holder 250, see also FIGS. 4*c* and *d*. The locking ring 240 is designed to rotatably hold the gear output shaft holder 250 and formed with a circular inner holder 242 in the manner of a ring. The locking ring 240 is arranged substantially within the gear housing 119 and is arranged on the end of the gear housing 119 facing away from the drive motor 114. The locking ring 240 is arranged axially to the tool axis 102 between the gear neck 138 and the drive motor 114. The locking ring 240 is designed to rotatably support the gear output shaft holder 250 substantially within the circular inner holder 242, see also FIG. 4*c*. The gear output shaft holder 250 is designed as a planetary carrier 174 of the third planetary gear stage 169, see also FIG. 4*d*. Here, the gear output shaft holder 250 abuts the locking ring 240 and connects the third planetary gear stage 169 to the gear output shaft 136. The gear output shaft holder 250 comprises an opening 252 to hold a protrusion 137 of the gear output shaft 136, see also FIG. 4*e*. By means of example, the opening 252 of the gear output shaft holder 250 is formed like a dumbbell. The gear output shaft holder 250 comprises a connection holder 254 formed on a side facing away from the drive motor 114, wherein it is here formed in sections as three bars arranged in a circumferential direction to the tool axis 102. The gear output shaft 136 comprises at least partially circumferential, shoulder-like protrusions 139 that can be connected to the connection holder 254 in a form-fit manner, see also FIG. 4*e*. An outer circumference of the connection holder 254 is rotatably arranged on the inner holder 242 of the locking ring 240.

The drive motor 114, in particular the motor housing 115, is arranged at least in sections within the insertion tool magazine 200, wherein the drive motor 114 at least partially projects into the inner holder 212 of the insertion tool magazine 200. The insertion tool magazine 200 overlaps the drive motor 114 at least in sections. The drive motor 114 is arranged at least in sections substantially concentrically to the insertion tool magazine 200.

The gear unit 118, in particular the gear housing 119, comprises an inner holder 188 that at least partially accommodates the drive motor 114, in particular the motor housing 115. Here, the inner holder 188 of the gear unit 118 encloses at least in sections the drive motor 114, in particular the motor housing 115. The gear housing 118 comprises a bar 190 that is at least partially circumferential. The motor housing 115 abuts at least partially the bar 190, wherein the inner holder 188 forms the bar 190. The inner holder 188 of the gear housing can be arranged radially to the tool axis between the motor housing and the insertion tool magazine.

FIG. 3 shows a side view of the insertion tool magazine 200 with the drive unit 111. The gear unit 118, in particular the gear housing 119, comprises at least one securing element 192 on the gear neck 138, wherein two securing elements 192 are provided here. The housing 110 comprises at least one securing holder 260, wherein two securing holders 260 are provided here, see also FIG. 4*h*. The securing holder 260 is designed such that the securing holder 260 accommodates the securing element 192 and secures the gear unit 118, in particular the gear housing 119, against rotations of the gear unit 118, in particular the gear housing 119. The securing element 192 is formed substantially parallel to the tool axis 102 and is formed in the manner of a bar. The securing element 192 and the gear neck 138 are formed in one piece. The securing holder 260 is designed to hold the securing element 192 at least in a form-fit manner.

The gear unit 118, in particular the gear housing 119, comprises a contact element 194. The housing 110 comprises a contact holder, see also FIG. 4*h*. The contact element 194 is designed to abut the contact holder 262, see also FIG. 2. The contact element 194 is arranged opposite to the gear neck 138 on the gear housing 119, wherein the gear housing 119 forms the contact element 194. The contact element 194 is coaxial and substantially concentric to the inner holder 188 of the gear unit 118, in particular the gear housing 119. Here, the contact element 194 is formed circumferentially to the tool axis 102 around the gear housing 119 and is formed as a contact bar. The contact element 194 is arranged transversely to the tool axis 102 on the gear housing 110.

Furthermore, the gear unit 118, in particular the gear housing 119, comprises at least one fixing element 196, wherein two fixing elements 196 are provided herein. The housing 110 comprises at least one fixing holder 264, wherein two fixing holders 264 are provided herein. The fixing holder 264 accommodates the fixing element 196 at least for axially securing the gear unit 118, in particular the gear housing 119. The fixing element 196 is formed as one piece with the gear housing 119. The fixing element 196 is here formed, by means of example, in the manner of a square disc type and in the circumferential direction to the tool axis 102 at the outer circumference of the gear housing 119. The fixing element 196 is coaxial to the inner holder 188 of the gear unit 118, in particular of the gear housing 119.

FIG. 4*a* shows a front perspective view of the gear housing 119. The gear housing 119 comprises a vent element 222, wherein the vent element 222 is formed at least partially axially to the gear unit 118, in particular the gear housing 119. FIG. 4*b* is a rear perspective view of the gear housing 119. The vent element 222 is formed herein as an axial groove that forms a polygonal opening at the gear neck 138, see also FIG. 4*a*. The vent element 222 is formed within an inner circumference 181 of the gear housing 119. The vent element 222 comprises two openings, wherein a first opening is formed on the gear neck 138 and a second opening is formed on the drive motor 114.

The gear housing 119 comprises the gear housing holder 185 for the gear end plate 182. The gear housing 119 and the gear housing holder 186 are formed in one piece, wherein the gear housing holder 182 is formed on the inner circumference 181 of the gear housing 119, wherein four gear housing holders 186 are formed. The ring gear 129 comprises at least one anti-rotation element 266, wherein three anti-rotation elements 266 are formed herein, see also FIG. 4*f*. The gear housing 110 comprises at least one anti-rotation holder 198 formed on an end facing away from the drive motor 114. The anti-rotation element 266 is designed to engage in the anti-rotation holder 198, thereby securing the ring gear 129 against rotation. The anti-rotation holder 198 is designed to complement the anti-rotation element 266, see also FIG. 4*f*. The anti-rotation holder 198 is shaped such that the anti-rotation element 266 at least engages in the anti-rotation holder 198 in a form-fit manner Here, the gear housing 119 forms the anti-rotation holder 198, wherein three anti-rotation holders 198 are formed.

The locking ring 240 comprises at least one locking bar 246 on its outer circumference 244, see also FIG. 4*c*. The gear housing 119 comprises at least one locking holder 270, wherein three locking holders 270 are formed herein. The locking bar 246 is designed to engage in the locking holder 270. The locking bar 246 and the locking holder 270 are designed to be complementary to each other. The anti-rotation holder 198 and the locking holder 270 are alternately arranged circumferentially in the gear housing 119, wherein these are separated from each other by housing bars 272.

FIG. 4*c* is a perspective view of the locking ring 240 of the gear unit 118. The locking bar 246 is formed in an arc-shape, wherein the locking bar 246 can at least engage in the locking holder 270 in a form-fit manner. Three locking bars 270 are formed here.

Figure 4D:
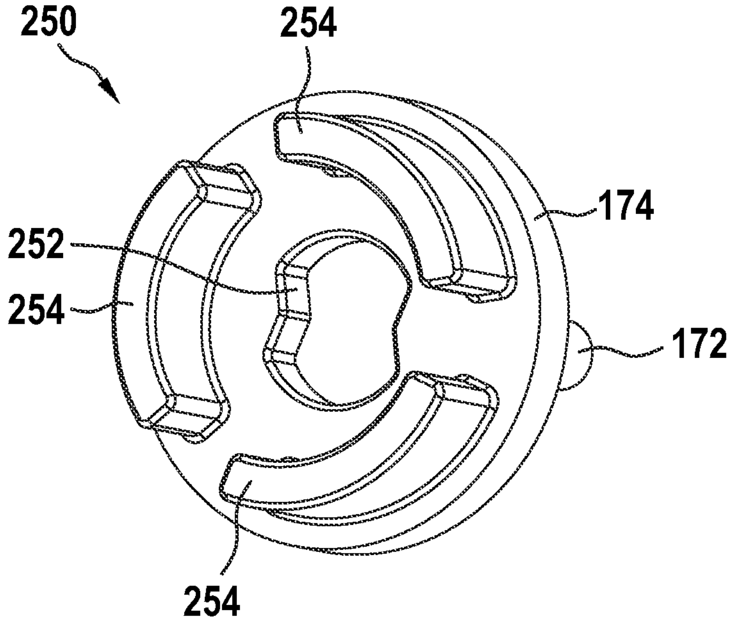
FIG. 4*d* a perspective view of a gear output shaft holder of the gear unit.
Figure 4E:
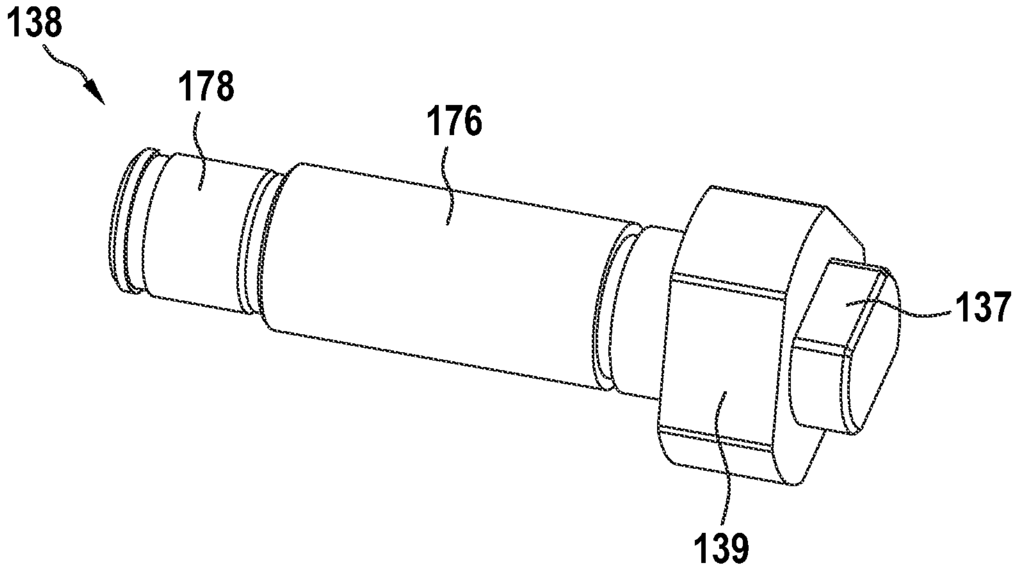
FIG. 4*e* a perspective view of a gear output shaft of the gear unit.
Figure 4F:
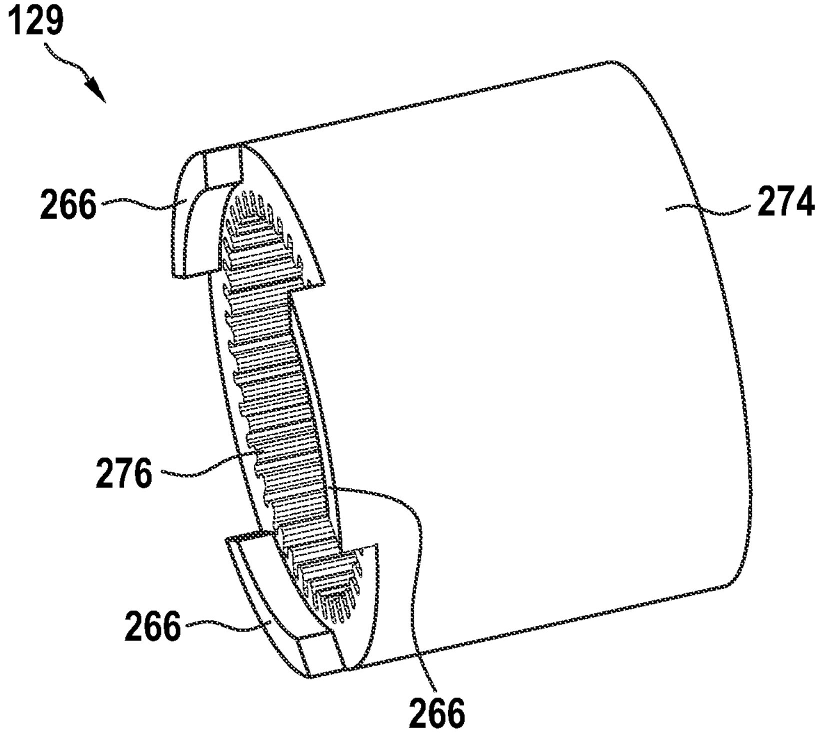
FIG. 4*f* a perspective view of a ring gear of the gear unit.

FIG. 4*d* shows a perspective view of the gear output shaft holder 250 of the gear unit 118. The planetary carrier 174 comprises three planetary bolts 172, wherein only one of the planetary bolts 172 is shown here. FIG. 4*e* shows a perspective view of the gear output shaft 136 of the gear unit 118. The gear output shaft 136 comprises a holder 176 for the gear output shaft bearings. In addition, the gear output shaft 136 comprises a holder 178 for the gearwheel 165 of the intermediate gear 164. FIG. 4*f* is a perspective view of the ring gear 129 of the gear unit 118. The ring gear 129 forms the anti-rotation element 266, wherein three anti-rotation elements 266 are provided herein. The ring gear 129 is formed in one piece with the anti-rotation elements 266. The anti-rotation elements 266 are circumferentially formed on the ring gear 129, wherein the anti-rotation elements 266 are formed at least partially as circumferential bars. The ring gear 129 comprises an outer holder 274 for the gear housing 119. In addition, the ring gear 129 comprises an inner toothing 276 for the planetary gear stages 167, 168, 169 of the planetary gear 166.

Figure 4G:
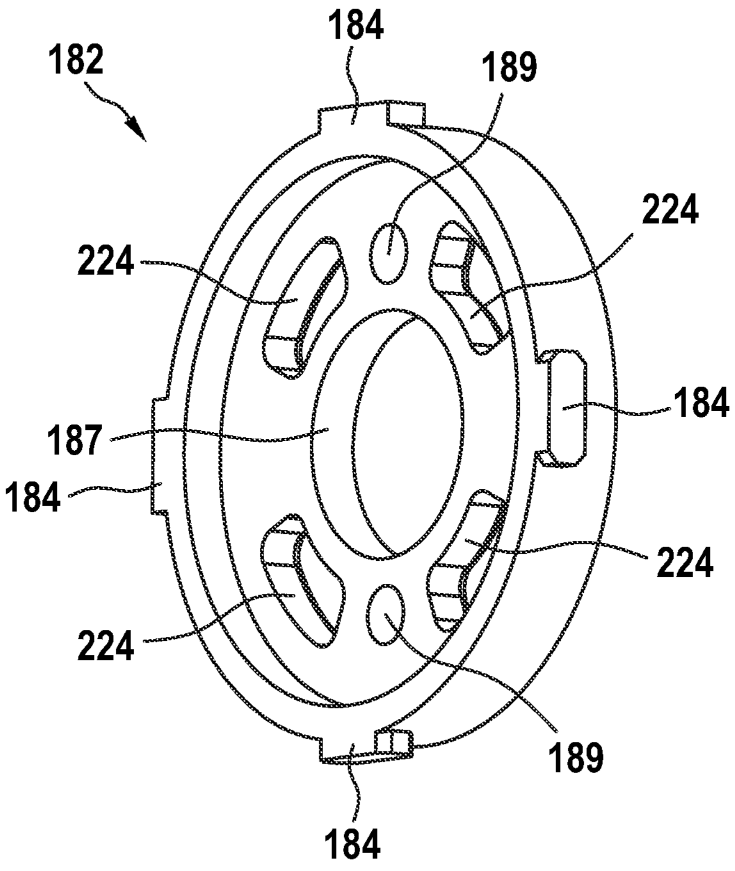
FIG. 4*g* a perspective view of a gear end plate of the gear unit.

FIG. 4*g* shows a perspective view of the gear end plate 182 of the gear unit 118. The gear end plate 182 is disc-shaped, wherein the gear end plate 182 forms the locking element 184. The gear end plate 182 and locking element 184 are formed as one piece here, wherein four locking elements 184 are provided. The locking element 184 is formed in the manner of a bar in the circumferential direction around the gear end plate 182. The locking element 184 forms a type of bayonet connection with the gear housing holder 186. The gear end plate 182 comprises a motor shaft opening 187 that is formed as a circle herein. The motor shaft opening 187 is formed such that the motor shaft 116 of the drive motor 114 can be passed through the motor shaft opening 187. An inner diameter of the motor shaft opening 187 is designed such that the motor pinion 117 on the motor shaft 116 can be passed through the motor shaft opening 187. The gear end plate 182 comprises at least one circumferentially formed air guide opening 224, wherein air guide openings 224 are provided here, each formed in an arc-shaped manner. The air guide opening 224 is designed to direct air in the direction of the drive motor 114. The air guide openings 224 are each arranged radially to the tool axis 102 between the motor shaft opening 187 and the locking element 184. The gear end plate 182 comprises at least one screw connection opening 189 for screwing the gear end plate 182 to the motor housing 115. Here, two screw connection openings 189 are provided. The screw connection opening 189 is designed such that at least one screw can be passed though through the screw connection opening 189 to the motor housing 115, such that the screw connection can be formed between the gear end plate 182 and the motor housing 115.

Figure 4H:
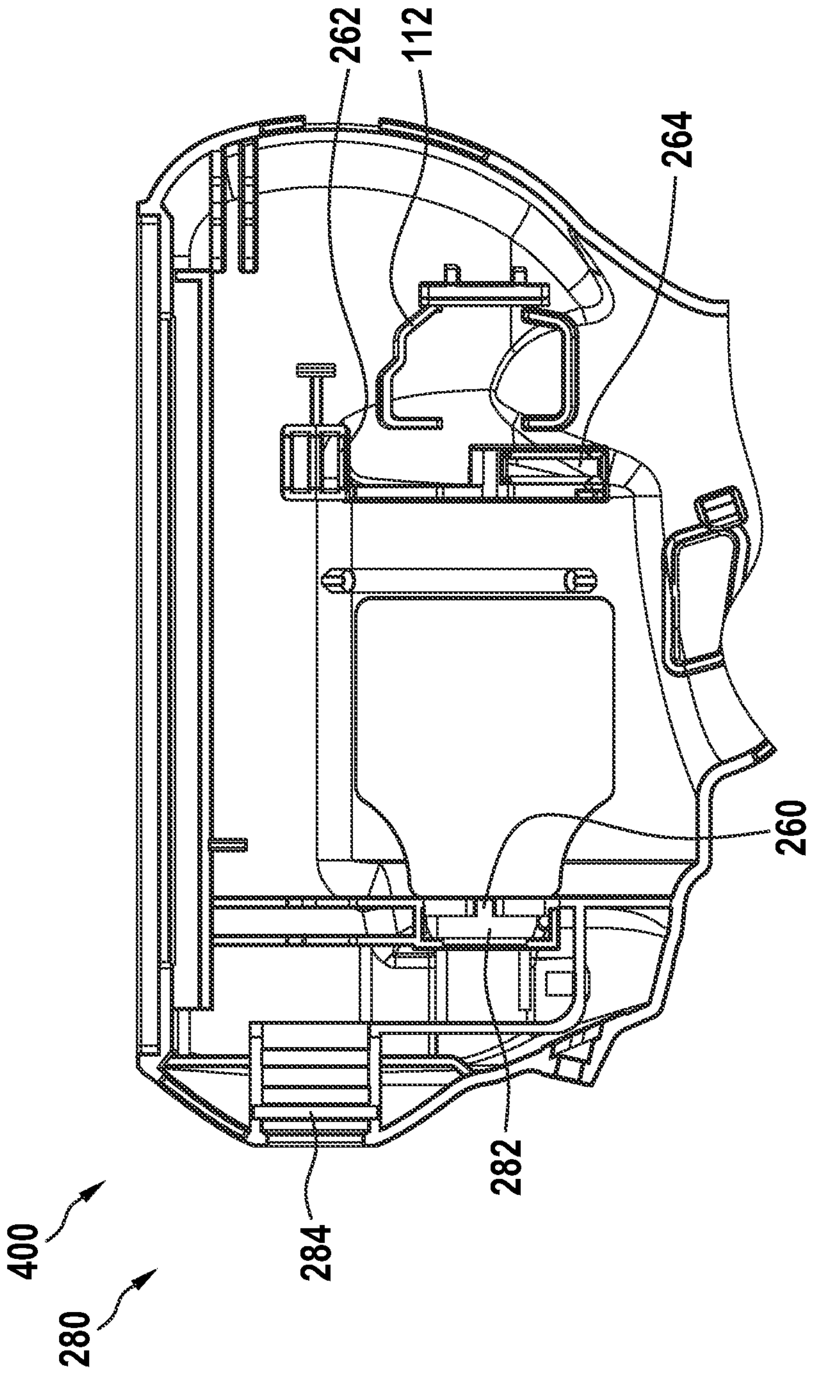
FIG. 4*h* a section of a side view of a housing half of a housing of the hand-held power tool.

FIG. 4*h* shows the section 400 of a side view of a housing half 280 of the housing 110 of the hand-held power tool 100. The securing holder 260 is formed in the manner of a shaft, wherein the housing 110 forms the securing holder 260. In addition, each housing half 280 comprises a securing holder 260. The contact holder 262 is formed as a bar transverse to the tool axis 102. The contact holder 262 is formed by the housing 110. The fixing holder 264 is formed as a type of pocket, wherein each housing half 280 forms a fixing holder 264. The housing half 280 comprises a holder 282 for the gear neck 138, wherein each of the housing halves 280 comprises a holder 282 for the gear neck 138. Furthermore, each of the housing halves 280 each has a holder 284 for the tool holder 150.

What is claimed is:

1. A hand-held power tool comprising:
- a housing;
- a drive motor within the housing;
- a gear unit operably connected to the drive motor and configured to drive a tool holder which is configured to hold an insertion tool; and
- an insertion tool magazine configured to store a plurality of selectable insertion tools, wherein
- the gear unit is arranged at least in sections within the insertion tool magazine, the gear unit comprising at least one air inlet opening defined in an end of the gear unit that faces away from the drive motor, the at least one air inlet opening being designed to direct air towards the drive motor.

2. The hand-held power tool according to claim 1, wherein:
- the gear unit comprises an outer holder for the insertion tool magazine; and
- the outer holder is designed such that the insertion tool magazine is rotatably arranged on the gear unit.

3. The hand-held power tool according to claim 1, wherein:
- the gear unit comprises a gear end plate; and
- the gear end plate is configured to be locked by at least one locking element via a gear housing holder.

4. The hand-held power tool according to claim 3, wherein:
- the gear end plate is configured to be connected to the drive motor;
- the gear end plate has a motor shaft opening; and
- the motor shaft opening is designed such that a motor shaft of the drive motor is passed through the motor shaft opening.

5. The hand-held power tool according to claim 1, wherein the gear unit comprises a gear end plate arranged at an end closest to the drive motor, the gear end plate having at least one circumferentially formed air guide opening designed to direct air towards the drive motor.

6. The hand-held power tool according to claim 1, wherein:
- the gear unit comprises at least one ring gear having at least one anti-rotation element;
- a gear housing comprises at least one anti-rotation holder designed on an end facing away from the drive motor; and
- the anti-rotation element is designed to engage in the anti-rotation holder and secure the ring gear against rotation.

7. The hand-held power tool according to claim 1, wherein:
- the gear unit comprises a locking ring and a gear output shaft holder; and
- the locking ring is designed to rotatably hold the gear output shaft holder.

8. The hand-held power tool according to claim 7, wherein:
- the locking ring comprises at least a locking bar on its outer circumference;
- a gear housing comprises at least one locking holder; and
- the locking bar is designed to engage in the locking holder.

9. The hand-held power tool according to claim 1, wherein the drive motor is arranged at least in sections within the insertion tool magazine.

10. The hand-held power tool of claim 1, wherein the gear unit comprises an inner holder that at least partially accommodates the drive motor.

11. The hand-held power tool according to claim 1, wherein:

the gear unit at a gear neck comprises at least one securing element;
the housing comprises at least one securing holder; and
the securing holder is designed such that the securing holder accommodates the securing element and secures the gear unit against rotation.

12. The hand-held power tool according to claim 1, wherein:
the gear unit comprises at least one contact element;
the housing comprises at least one contact holder; and
the contact element is designed to abut the contact holder and to introduce at least radial forces that occur into the housing.

13. The hand-held power tool according to claim 1, wherein:
the gear unit comprises at least one fixing element;
the housing comprises at least one fixing holder; and
the fixing holder accommodates the fixing element to axially secure the gear unit.

14. The hand-held power tool according to claim 1, wherein:
the gear unit comprises at least one vent element arranged at least partially axial to the gear unit and/or the drive motor and designed to vent at least the gear unit.

15. The hand-held power tool of claim 1, wherein the hand-held power tool is a screwdriver.

16. The hand-held power tool of claim 1, wherein the at least one air inlet opening extends through a gear housing of the gear unit in an axial direction.

17. The hand-held power tool of claim 16, wherein the at least one air inlet opening extends through an axially-facing end surface of the gear housing.

18. The hand-held power tool of claim 1, wherein the at least one air inlet is arranged circumferentially around a gear neck of the gear unit.

* * * * *